Patented Apr. 20, 1943

2,317,114

UNITED STATES PATENT OFFICE 2,317,114

METHOD OF PRODUCING PIGMENTED ENAMEL ARTICLES

Jacob E. Rosenberg, Pittsburgh, Pa., assignor to Homelaya, Incorporated, a corporation of Pennsylvania No Drawing. Application October 28, 1940, Serial No. 363,143

1 Claim. (Cl. 117—53)

This invention relates to the production of enamel-ware articles and, more specifically, of articles of iron that carry coatings of glass, and consists in a method whereby in a one-step procedure a coating may be produced of a color not otherwise practically attainable.

In the production of enamel ware of familiar character, a coating of glass is fused upon a surface metal, ordinarily of iron. In order to effect a secure union of the fused and solidified coating to the underlying body of iron, the glass of the coating may contain in its composition an ingredient that, when the coating is in fused condition, will attack and erode the iron surface, producing minute pits. Into these pits the still molten glass will penetrate, and thereafter, when the glass solidifies, the intrusions of glass within the pits will hold the coating, rooted, as it were to the iron. Glasses so compounded and applied will be found to be described in Letters Patent of the United States Nos. 2,043,559 (June 9, 1936) and 2,086,190 (July 6, 1937), granted on my applications.

Other ways of improving the security of the union of the glass coating to the metal surface are known and practised. The value of cobalt as an intermediary, to increase security is indicated in the Hommel patents, Nos. 1,805,143 (May 12, 1931) and 1,819,816 (August 18, 1931).

It is known practice to include in the slip, or its equivalent, that is spread upon the iron surface to produce a single-coat enamel, a pigment that shall afford in the fired article the desired color effect. It has, however, been found with respect to particular colors, and specifically, with respect to yellows and reds that consist of or include the sulphide of cadmium, the selenide of cadmium, the sulpho-selenide of cadmium, chromium oxide, and the spinels and compounds obtained by heating chromium oxide with oxides of iron, zinc, aluminum, and cobalt, that they may not be so employed. It is found that, if attempt be made so to employ them, or any of them, as pigments, the bond of the glass to the iron is inadequate, and the product is not commercially successful.

I have investigated the matter, making laboratory experiments, and determined to my satisfaction the root of the difficulty, and, having so found the root of the difficulty, I have perceived, and this is my invention, that the difficulty may be avoided and a successful result got.

In the procedure first above alluded to, that disclosed in the specification of the Rosenberg Patent 2,043,559, the glass that in powdered form is worked to a slip and applied to the surface of the iron article carries an oxidizing agent, typically sodium antimonate; in the melted glass antimony in pentavalent form is present, and, being present, attacks the iron of the surface upon which the glass is melted. In the second of the procedures alluded to above (that of the Hommel patents, 1,805,143 and 1,819,816) the salt of a suitable metal, typically cobalt, present at the time of firing at the iron-glass interface, attacks the substance of the iron. I have found in both of these cases that, if a pigment of the specific sort indicated (compounds of cadmium and chromium) be used, the pigment will react with the oxidizing agent (antimony in pentavalent form in one case, cobalt salt in the other case), and prevent that agent from adequately performing its intended function of attacking the iron surface.

I have perceived (and this is my invention) that I may initially spread a slip, or its equivalent, of the character specified in either of the prior patents named, lacking the pigment of the character here specified, and I may then cover the applied layer of slip or its equivalent conveniently by spraying with a covering that shall carry the pigment. The article may then be fired. The desired reaction will occur at the metal-glass interface; the pigment carried in the overspray will not be effective to disturb or impair that attack; and the pigment so present in the overspray will give in the fired article the desired color effect.

The applied coating of enamel may be such as is specified in the patents named above. The overspray will conveniently be essentially a low-melting glass otherwise colorless, and carrying one or more of the compounds specified, of cadmium and chromium. The pigment may be modified by mixing with it an inert modifier, such, for example, as zinc oxide.

The slip or its equivalent, having been spread, is preferably dried, and upon it when dry the overspray is laid in known manner, and when the oversprayed coating is dry the article is fired in conventional manner. A one-coat enamel is produced that is at once adherent to the underlying metal and is of the desired color.

I claim as my invention:

The method herein described of producing one-coat enameled iron articles of red and yellow color adequately bonded to the iron, which consists in spreading upon the surface of the iron article to be enameled a vitrifiable coating that carries an iron-eroding content of sodium antimonate, spreading upon such coating still in unfired condition a second coating that carries as a pigment a cadmium selenide, and firing the article so coated, whereby the iron-eroding content has unimpaired bonding effect and the unreacted pigment colors the surface of the fired article.

JACOB E. ROSENBERG.